United States Patent
Volanek

(10) Patent No.: US 10,654,387 B2
(45) Date of Patent: May 19, 2020

(54) VEHICLE COMPONENT AND METHOD FOR PRODUCING A VEHICLE COMPONENT

(71) Applicant: Adient Luxembourg Holding S.à.r.l., Luxembourg (LU)

(72) Inventor: Peter Volanek, Trencin (SK)

(73) Assignee: Adient Luxembourg Holding S.àr.l., Luxembourg (LU)

( * ) Notice: Subject to any disclaimer, the term of this patent is extended or adjusted under 35 U.S.C. 154(b) by 0 days.

(21) Appl. No.: 15/533,213

(22) PCT Filed: Dec. 4, 2015

(86) PCT No.: PCT/EP2015/078695
§ 371 (c)(1),
(2) Date: Jun. 5, 2017

(87) PCT Pub. No.: WO2016/087655
PCT Pub. Date: Jun. 9, 2016

(65) Prior Publication Data
US 2017/0320458 A1 Nov. 9, 2017

(30) Foreign Application Priority Data
Dec. 5, 2014 (DE) .......... 10 2014 225 011

(51) Int. Cl.
*B60N 2/75* (2018.01)
*B60N 2/70* (2006.01)
*B60R 21/02* (2006.01)

(52) U.S. Cl.
CPC ............ *B60N 2/75* (2018.02); *B60N 2/7017* (2013.01); *B60N 2/753* (2018.02); *B60R 21/02* (2013.01)

(58) Field of Classification Search
CPC ........ B60N 2/75; B60N 2/753; B60N 2/7017; B60R 21/02
See application file for complete search history.

(56) References Cited

U.S. PATENT DOCUMENTS

| | | | | |
|---|---|---|---|---|
| 3,848,926 A | * | 11/1974 | Kuroishi | B60N 2/7058 297/452.26 |
| 4,902,072 A | * | 2/1990 | Chancellor, Jr. | A47C 7/543 297/115 |
| 5,342,115 A | * | 8/1994 | De Filippo | B60N 2/753 297/411.32 |
| 5,409,297 A | * | 4/1995 | De Filippo | B60N 2/757 297/411.32 |
| 5,611,977 A | * | 3/1997 | Takei | A47C 7/54 264/46.5 |
| 5,730,917 A | * | 3/1998 | Ishikawa | B29C 33/12 264/46.5 |
| 6,059,369 A | * | 5/2000 | Bateson | B29C 70/222 297/452.18 |

(Continued)

FOREIGN PATENT DOCUMENTS

| | | |
|---|---|---|
| EP | 0 571 333 A1 | 11/1993 |
| EP | 1 595 690 A2 | 11/2005 |

*Primary Examiner* — Philip F Gabler
(74) *Attorney, Agent, or Firm* — Marshall & Melhorn, LLC.

(57) ABSTRACT

A vehicle component, in particular an arm rest, includes a structural part and a cladding element that at least partially surrounds the structural part. The structural part is at least partially covered by a protective device.

20 Claims, 2 Drawing Sheets

(56) References Cited

U.S. PATENT DOCUMENTS

| | | | |
|---|---|---|---|
| 6,468,450 B1 | 10/2002 | Takei | |
| 6,513,877 B1 * | 2/2003 | Ikeda | B60N 2/7017 |
| | | | 297/411.33 |
| 7,338,129 B2 * | 3/2008 | Tabata | B60N 2/80 |
| | | | 297/391 |
| 9,434,340 B2 * | 9/2016 | Egusa | B60R 7/04 |
| 2004/0144818 A1 * | 7/2004 | Marhefka | B60R 7/14 |
| | | | 224/275 |
| 2017/0320458 A1 * | 11/2017 | Volanek | B60N 2/7017 |
| 2018/0208084 A1 * | 7/2018 | Patel | B60N 2/753 |

* cited by examiner

VEHICLE COMPONENT AND METHOD FOR PRODUCING A VEHICLE COMPONENT

CROSS REFERENCE TO RELATED APPLICATIONS

This application is a United States National Phase Application of International Application PCT/EP2015/078695 filed Dec. 4, 2015, and claims the benefit of priority under 35 U.S.C. § 119 of German Application 10 2014 225 011.0, filed Dec. 5, 2014, the entire contents of which are incorporated herein by reference.

FIELD OF THE INVENTION

The present invention relates to a vehicle component, in particular an armrest, and to a method for producing a vehicle component.

BACKGROUND OF THE INVENTION

Vehicle components which comprise a structural part and a trim element are well known from the prior art. For example, the vehicle component is an armrest and the trim element is the outer skin of a cushion. Said structural part is typically embedded into the cushion, in order to withstand any loads of the vehicle component, without the vehicle component being deformed excessively or even destroyed. Such vehicle components, such as armrests, are typically produced by a filling element being introduced between the trim element and the structural part and subsequently being cured. The cured foam-like filling element then as a rule forms the cushion.

Even if it is not arranged visibly on the vehicle component, a certain risk of injury can emanate from the structural part, in particular in an accident situation. It is therefore as a rule strictly ensured that the structural part does not have any edges or pointed contours which increase the potential hazard in the accident situation. In order to lower the potential hazard, the prior art provides complicated reshaping of the structural part before the production of the vehicle component, in order to satisfy the necessary safety standards

SUMMARY OF THE INVENTION

It is an object of the present invention to provide a vehicle component which can be produced simply and at the same time complies with the necessary safety standards.

The present invention achieves the object by way of a vehicle component, in particular an armrest, which has a structural part and a trim element which surrounds the structural part at least partially, the structural element being covered at least partially by a protective apparatus.

In comparison with the prior art, the vehicle component according to the invention has the advantage of the protective apparatus, by way of which regions of the structural part can be covered, from which regions a certain potential hazard emanates in the accident situation. In particular, complicated reshaping of the structural part can be dispensed with here, by way of which the potential hazard is otherwise to be reduced. Instead, the potential hazard is reduced by way of the protective apparatus.

The structural part is preferably embedded completely in the vehicle component and is arranged within the trim element, in particular, such that it is not visible to a passenger. It is provided, furthermore, that the protective apparatus is arranged directly on the structural part. Here, the protective apparatus is connected releasably or non-releasably to the structural part. For example, the protective apparatus is connected non-releasably to the structural part via an integrally joined connection, or is connected releasably to the structural part via a clipped connection. It is provided, furthermore, that the protective apparatus has an at least partially bent or curved outer contour or outer side. The potential hazard can be reduced in an advantageous way by means of the bent or curved outer contour. Furthermore, it is conceivable that the structural part is connected indirectly to a component of the vehicle chassis or a component of a vehicle seat.

It is provided according to a further embodiment of the present invention that the protective apparatus covers an edge, a burr or a punching burr of the structural part, in particular covers it completely. In particular, the protective apparatus extends at least partially over two side faces of the structural part and ensures as a result that an edge profile between two adjacent side faces is flattened and thus the risk of injury which emanates from the otherwise sharp edge is reduced.

It is provided according to a further embodiment of the present invention that the protective apparatus is of sleeve-shaped configuration. It is provided, in particular, that the sleeve-shaped protective apparatus has a receptacle, within which a part of the structural part is arranged with an accurate fit in the mounted state. The receptacle is preferably configured in a matching manner with respect to a region of the structural part which has an edge. It is preferably provided, furthermore, that the sleeve-shaped protective apparatus is pulled onto the structural part in the mounted state. In particular, the protective apparatus forms a type of cap or termination of the structural part.

It is provided according to a further embodiment of the present invention that an outer side of the protective apparatus has a contour profile in the shape of a partial circle with a radius which is greater than 3.2 mm or corresponds to 3.2 mm. In other words, the outer side of the protective apparatus has a region with a contour profile in the shape of a partial circle; the contour profile in the shape of a partial circle is to be assigned a radius which is greater than 3.2 mm or corresponds to 3.2 mm. Here, the contour profile is preferably to be understood to mean a circumferential profile along a sectional face through the protective apparatus. A contour profile in the shape of a partial circle with a radius of 3.2 mm or more ensures that the hazard risk as a result of the structural part is reduced to a desired magnitude. In particular, the protective apparatus has a plurality of contour profiles of this type in the shape of a partial circle, the radii of which are all greater than 3.2 mm, without the radii coinciding among one another. It is conceivable, furthermore, that the outer side of the protective apparatus has a completely circular contour profile.

It is provided according to a further embodiment of the present invention that the structural part comprises at least one tubular part component, the protective apparatus being arranged on the end side on the tubular part component and/or being placed onto the tubular part component as a termination. It is provided, in particular, that the structural part comprises a plurality of tubular part components which are arranged adjacently with respect to one another in one plane and are connected along their longitudinal axis in an integrally joined manner, in particular are welded, in each case to an adjacent tubular part component. Here, two adjacent tubular part components are preferably connected by way of a welded seam in such a way that the welded seam is not accessible to a ball with a diameter of 165 mm.

It is provided according to a further embodiment of the present invention that the structural part is spaced apart from the trim element, and a filling element, preferably a PU foam, is arranged, in particular, between the trim element and the structural part. As a result, the trim element and the filling element can form a cushion for the vehicle component. The vehicle component is, in particular, a vehicle component which is produced in a "pour in place" process, and/or the filling element, in particular the cured and/or foam-like filling element, determines the shape of the vehicle component.

It is provided according to a further embodiment of the present invention that the structural part is produced from a metal and/or the protective apparatus is produced from a plastic. A comparatively resilient structural part can be provided in an advantageous manner by way of the use of metal as a material for the structural part. The use of protective apparatuses made from plastic simplifies the realization of the rounded portions, by way of which the potential hazard is reduced, without the weight of the vehicle component being increased significantly.

A further subject of the present invention is a method for producing a vehicle component, in particular a vehicle component according to the invention, a structural part, preferably a metallic structural part, being provided in a first method step, a region of the structural part being covered by way of a protective apparatus, preferably a protective apparatus made from plastic, in a second method step, and the structural part which is covered by way of the protective apparatus being encased by a trim element in a third method step.

In comparison with the prior art, the method according to the invention has the advantage that a defined region of the structural part is covered in a targeted manner in order to reduce the potential hazard. Here, in particular, the protective apparatus is connected to the structural part in an integrally joined, positively locking and/or non-positive manner in the second method step, in particular is connected releasably or non-releasably. It is preferably provided, furthermore, that the shape of the structural part is flattened at least in regions by means of the protective apparatus. To this end, the protective apparatus is preferably arranged in the region of an edge of the structural part. It is provided, in particular, that the protective apparatus has a contour profile on its outer side, which contour profile is at least partially in the shape of a partial circle, a region with a contour profile in the shape of a partial circle being assigned a radius which is at least 3.2 mm. In particular, the protective apparatus has a plurality of regions of this type, the radii of which are all greater than 3.2 mm, without the radii coinciding among one another.

It is provided according to a further embodiment of the present invention that a filling element, preferably a foam-like filling element, such as for example PU foam, is embedded between the trim element and the structural element in a fourth method step. A "pour in place" process is preferably used to produce the vehicle component, in particular the armrest. To this end, the filling element is embedded in liquid form between the structural part and the trim element. The filling element hardens as a result of the subsequent polymerization and, in the hardened state, defines the shape of the vehicle component.

Further details, features and advantages of the invention result from the drawings and from the following description of preferred embodiments using the drawings. Here, the drawings illustrate merely exemplary embodiments of the invention which do not restrict the concept of the invention.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
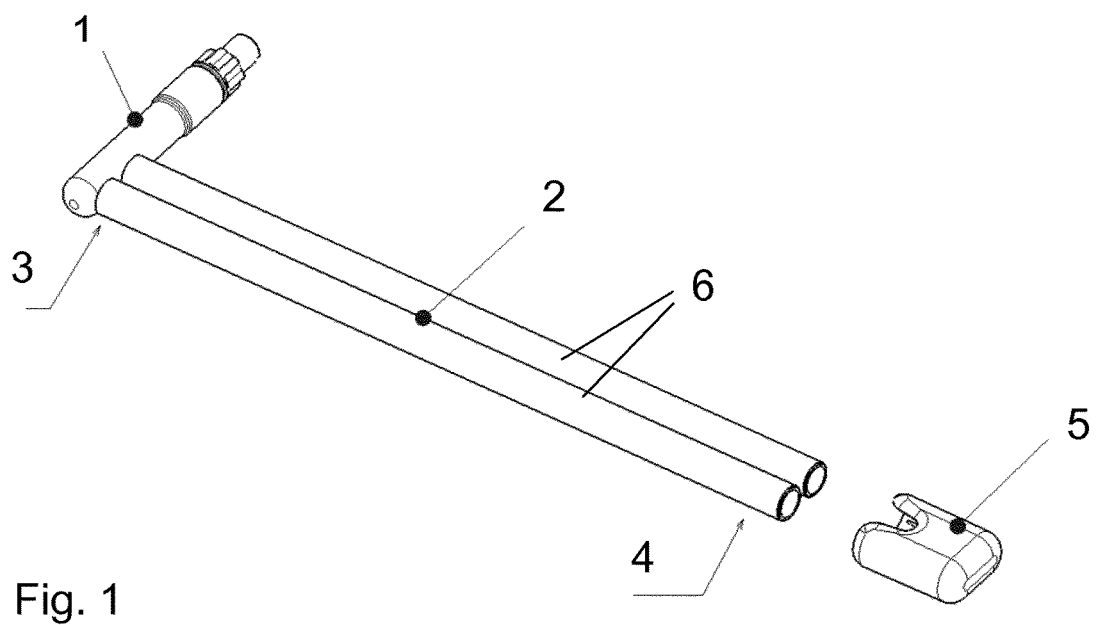
FIG. 1 is a perspective view of a part of a vehicle component according to one exemplary embodiment of the present invention, shown in a dismantled state.

Referring to the drawings, in the various figures, identical parts are always provided with the same designations and are therefore also as a rule named or mentioned in each case only once.

FIG. 1 shows a part of a vehicle component according to one exemplary embodiment of the present invention, in a dismantled state. The vehicle component is, in particular, a pivotable armrest which is, for example, a part of a center console and/or a backrest. In particular, the vehicle component comprises a (preferably metallic) structural part 2 which is surrounded or encapsulated by a trim element (not shown here). A foam-like filling element (not shown here), in particular a PU foam, is preferably arranged between the structural part 2 and the trim element for cushioning and shaping purposes. It is preferably provided that the vehicle component is produced by way of a "pour in place" process, that is to say the filling element is embedded or injected in liquid form between the structural part 2 and the trim element, and the filling element assumes its final shape by way of a subsequent polymerization and thus finally defines the shape for the vehicle component. Here, the structural part 2 is arranged, in particular, within the trim or the filling element. In the embodiment which is shown, the structural part 2 comprises two tubular part components 6 which are welded onto one another and are fused to one another along their longitudinal side. It is also conceivable that a plurality of tubular part components 6 are connected to one another in an integrally joined manner. In particular, the tubular part components 6 are fused to one another on their underside. It is preferably provided here that a welded seam which is produced by way of the welding operation is not accessible for a ball with a diameter of 165 mm. In particular, the two tubular part components which are welded together form a type of double tube. It is provided, furthermore, that said double tube is welded onto a shank 1 by way of one of its end sides, in particular in a connecting region 3, the shank 1, for example in the case of the armrest, forming a rotational axis for pivoting the armrest. The double tube has an opening region 4 in a manner which lies opposite the connecting region 3. The edges which can be found in the opening region 4 can form a source of danger in an accident situation and are therefore to be rounded. It is provided here, in particular, that a protective apparatus 5 trims the opening region 4, the protective apparatus 5 ensuring, by way of its at least partially rounded outer side, the desired rounded nature in the edge region of the structural part 2. To this end, the protective apparatus 5 is preferably of sleeve-shaped configuration, the sleeve-shaped protective apparatus having a receptacle which is of complementary configuration with respect to the structural part 2 and in which the end side of the structural part 2 is preferably arranged with an accurate fit in the mounted state. In the manner of a key/lock principle, the sleeve-shaped protective apparatus 5 can then be placed or pushed onto the structural part 2 in such a way that, in the mounted state, the protective apparatus 5 closes off the structural part 2 on its end side, in particular forms a cap-like termination. It is provided here, furthermore, that an outer contour of the protective apparatus 5 is configured at least partially in the form of a partial circle, that is to say an outer circumference a sectional face through the protective apparatus 5 is at least partially in the form of a partial circle. In particular, a region of the protective apparatus 5 in the form of a partial circle is assigned a radius which is greater than 3.2 mm. As a result, a flattened nature can be achieved in the opening region 4 of the structural part 2, by way of which flattened nature the risk of injury as a result of the structural part 5 is advantageously reduced in the event of an accident.

Figure 2:
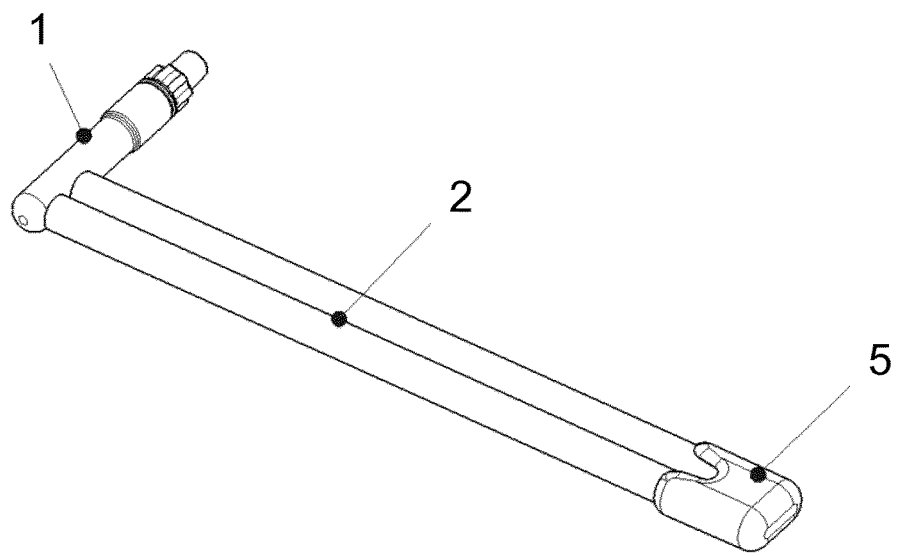
FIG. 2 is a perspective view of a part of a vehicle component according to one exemplary embodiment of the present invention, in a mounted state.
Figure 3:
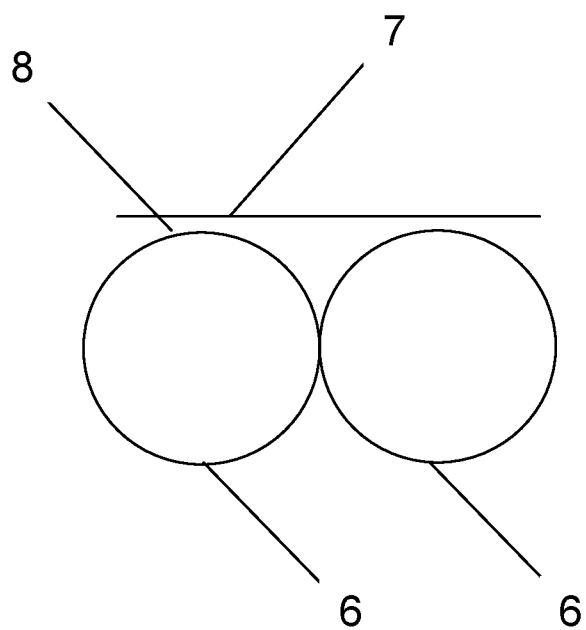
FIG. 3 is a schematic cross-sectional illustration of a portion of the vehicle component illustrated in FIGS. 1 and 2 of the disclosure.

FIG. 2 shows a part of a vehicle component according to one exemplary embodiment of the present invention, in a mounted state. Here, the protective apparatus 5 is pushed onto one of the end sides 2 and covers the edge region which would otherwise be exposed. It is conceivable, furthermore, that the protective apparatus 5 is connected to the structural part 2 in an integrally joined, positively locking and/or non-positive manner. For example, after having been pushed on, the protective apparatus 5 is welded to the structural part 2, or the protective apparatus 5 is clipped to the structural part 2.

While specific embodiments of the invention have been shown and described in detail to illustrate the application of the principles of the invention, it will be understood that the invention may be embodied otherwise without departing from such principles.

The invention claimed is:

1. An armrest for a vehicle seat, the armrest comprising:
an armrest structural part comprising a pivot end and an extended end located opposite the pivot end at a spaced location from the pivot end, wherein the pivot end being configured to be pivotably connected to a vehicle seat, wherein the pivot end defines a rotation axis, wherein the armrest is rotatable about the rotation axis; and wherein the extended end of the armrest structural part comprises an edge profile interposed between two adjacent side faces of the armrest structural part;
an armrest protective apparatus, wherein at least a portion of the armrest protective apparatus extends over the two adjacent side faces of the armrest structural part so that the edge profile of the armrest structural part is flattened to reduce a risk of injury to a user of the armrest; and
a trim element which surrounds the armrest structural part at least partially, wherein the armrest structural part is covered at least partially by the protective apparatus.

2. The armrest as claimed in claim 1, wherein the armrest structural part is arranged completely within the trim element, wherein the armrest structural part comprising a first tubular armrest component and a second tubular armrest component, and wherein the first tubular armrest component and the second tubular armrest component extending directly adjacent to one another from the pivot end to the extended end.

3. The armrest as claimed in claim 1, wherein the armrest protective apparatus is arranged directly on the armrest structural part, wherein the pivot end is in contact with a pivotable shank, and wherein the extended end faces in a direction away from the pivotable shank.

4. The armrest as claimed in claim 1, wherein the armrest protective apparatus has at least one of an at least partially bent outer contour and a curved outer contour.

5. The armrest as claimed in claim 1, wherein the armrest protective apparatus covers at least one of an edge, a burr, and a punching burr of the armrest structural part.

6. The armrest as claimed in claim 1, wherein the armrest protective apparatus is of a sleeve-shaped configuration.

7. The armrest as claimed in claim 6, wherein the sleeve-shaped armrest protective apparatus has a receptacle, within which a part of the armrest structural part is arranged in a mounted state.

8. The armrest as claimed in claim 1, wherein an outer side of the armrest protective apparatus has a contour profile in a shape of a partial circle with a radius which is greater than 3.2 mm or corresponds to 3.2 mm.

9. The armrest as claimed in claim 1, wherein the armrest structural part comprises at least one armrest tubular part component; and
wherein at least one of the armrest protective apparatus is arranged on an end side on the armrest tubular part component and the armrest protective apparatus is placed onto the armrest tubular part component as a termination element.

10. The armrest as claimed in claim 1, further comprising a filling element, wherein the armrest structural part is spaced apart from the trim element, and wherein the filling element being arranged between the trim element and the armrest structural part.

11. The armrest as claimed in claim 10, wherein the filling element comprises a polyurethane foam.

12. The armrest as claimed in claim 1, wherein the armrest structural part is produced from at least one of a metal and a plastic.

13. The armrest as claimed in claim 1, wherein the pivot end engages a pivotable shank, and wherein the extended end faces in a direction away from the pivotable shank.

14. The armrest as claimed in claim 1, wherein the armrest structural part comprises a first tubular component and a second tubular component, wherein a portion of the first tubular component and a portion of the second tubular component extend continuously from a position adjacent to the pivot end to the extended end, wherein the portion of the first tubular component is in continuous contact with the portion of the second tubular component from the position adjacent to the pivot end to the extended end, wherein the armrest protective apparatus comprising a planar protective apparatus surface, wherein the planar protective apparatus surface bridging an intermediate space between the first tubular component and the second tubular component, wherein the armrest structural part engaging a pivotable shank, and wherein the pivot end being adjacent to the pivotable shank, the extended end facing in a direction away from the pivotable shank.

15. A method for producing an armrest for a vehicle seat, wherein the armrest comprises an armrest structural part, an armrest protective apparatus, and a trim element which surrounds the armrest structural part at least partially, wherein the armrest structural part is covered at least partially by the armrest protective apparatus, the method comprising the steps of:

providing the armrest structural part, wherein the armrest structural part comprising a pivot end and an extended end located opposite the pivot end at a spaced location from the pivot end, wherein the pivot end being configured to be pivotably connected to the vehicle seat, wherein the pivot end defines a rotation axis, wherein the armrest is rotatable about the rotation axis, and wherein the extended end of the armrest structural part comprises an edge profile interposed between two adjacent side faces of the armrest structural part;

covering at least a portion of the extended end of the armrest structural part by with the armrest protective apparatus; and encasing the armrest structural part by the trim element, wherein the armrest protective apparatus is provided such that at least a portion of the armrest protective apparatus extends over the two adjacent side faces of the armrest structural part so that the edge profile of the armrest structural part is flattened to reduce a risk of injury to a user of the armrest.

16. The method as claimed in claim 15, wherein a foam filling is embedded between the trim element and the armrest structural part in a fourth method step, and wherein the foam filling element comprises polyurethane.

17. The method as claimed in claim 15,
wherein the armrest structural part comprises a metallic structural part; and
wherein the armrest protective apparatus is formed of plastic.

18. The method as claimed in claim 15, wherein the armrest structural part comprises a first tubular component and a second tubular component, wherein a portion of the first tubular component and a portion of the second tubular component extend continuously from a position adjacent to the pivot end to the extended end, wherein the portion of the first tubular component is in continuous contact with the portion of the second tubular component from the position adjacent to the pivot end to the extended end, wherein the armrest protective apparatus comprising a planar protective apparatus surface, wherein the planar protective apparatus surface bridging an intermediate space between the first tubular component and the second tubular component, wherein the armrest structural part engaging a pivotable shank, wherein the pivot end being adjacent to the pivotable shank, and wherein the extended end facing in a direction away from the pivotable shank.

19. An armrest for a vehicle seat, the armrest comprising:
an armrest structure comprising an armrest pivot end, an armrest extended end and an armrest structural part, wherein the armrest structural part being connected to the armrest pivot end, wherein the armrest pivot end being configured to be pivotably connected to the vehicle seat, wherein the armrest pivot end defining a pivot axis, wherein the armrest structure is pivotable about the armrest pivot end relative to the vehicle seat, wherein the armrest pivot end being located at a spaced location from the armrest extended end, wherein the armrest structural part comprising a first armrest structural component and a second armrest structural component, wherein the first armrest structural component comprising a first armrest structural component arcuate connecting region, wherein the second armrest structural component comprising a second armrest structural component arcuate connecting region, wherein the first armrest structural component arcuate connecting region being directly adjacent to the second armrest structural component arcuate connecting region, wherein the first armrest structural component arcuate connecting region being connected to the second armrest structural component arcuate connecting region, wherein the first armrest structural component and the second armrest structural component defining an intermediate space, wherein the armrest extended end comprising the first armrest structural component arcuate connecting region and the second armrest structural component arcuate connecting region, and wherein the extended end of the armrest structural part comprises an edge profile interposed between two adjacent side faces of the armrest structural part;

an armrest protective apparatus comprising a first arcuate side portion, a second arcuate side portion and a planar surface extending between the first arcuate side portion and the second arcuate side portion, wherein the planar surface bridges the intermediate space, and wherein at least a portion of the armrest protective apparatus extends over the two adjacent side faces of the armrest structural part so that the edge profile of the armrest structural part is flattened to reduce a risk of injury to a user of the armrest; and a trim element at least partially surrounding the armrest structural part, wherein the armrest protective apparatus at least partially covers the first armrest structural component and the second armrest structural component.

20. An armrest as claimed in claim 19, wherein the first armrest structural component arcuate connecting region is connected to the second armrest structural component arcuate connecting region via a welded connection, wherein the first armrest structural component is parallel to the second armrest structural component, wherein the first armrest structural component arcuate connecting region extends directly adjacent to the second armrest structural component arcuate connecting region from a position adjacent to the armrest pivot end to the armrest extended end.

* * * * *

UNITED STATES PATENT AND TRADEMARK OFFICE
CERTIFICATE OF CORRECTION

PATENT NO.       : 10,654,387 B2
APPLICATION NO.  : 15/533213
DATED            : May 19, 2020
INVENTOR(S)      : Peter Volanek Page 1 of 1

It is certified that error appears in the above-identified patent and that said Letters Patent is hereby corrected as shown below:

In the Claims

Claim 15, Column 7, Line 15 delete the word "by"

Signed and Sealed this
Twenty-eighth Day of July, 2020

Andrei Iancu
*Director of the United States Patent and Trademark Office*